United States Patent
Forster et al.

(10) Patent No.: US 9,319,395 B2
(45) Date of Patent: Apr. 19, 2016

(54) SYSTEM AND METHOD FOR SECURING AUTHENTICATION INFORMATION IN A NETWORKED ENVIRONMENT

(71) Applicant: SailPoint Technologies, Inc., Wilmington, DE (US)

(72) Inventors: Craig Robert William Forster, Austin, TX (US); Daniel Thomas Greff, Austin, TX (US); Crandall B. T. Chow, Austin, TX (US); Phillip Goldenburg, Austin, TX (US)

(73) Assignee: Sailpoint Technologies, Inc., Wilmington, DE (US)

( * ) Notice: Subject to any disclaimer, the term of this patent is extended or adjusted under 35 U.S.C. 154(b) by 0 days.

(21) Appl. No.: 14/318,133

(22) Filed: Jun. 27, 2014

(65) Prior Publication Data

US 2015/0012751 A1    Jan. 8, 2015

Related U.S. Application Data

(60) Provisional application No. 61/842,831, filed on Jul. 3, 2013.

(51) Int. Cl.
*H04L 29/06* (2006.01)
*H04L 9/30* (2006.01)
*G06F 21/31* (2013.01)

(52) U.S. Cl.
CPC ............... *H04L 63/08* (2013.01); *G06F 21/31* (2013.01); *H04L 9/30* (2013.01); *H04L 63/029* (2013.01); *H04L 63/0428* (2013.01); *G06F 2221/2115* (2013.01); *H04L 63/0272* (2013.01)

(58) Field of Classification Search
CPC .... H04L 63/08; H04L 63/0272; H04L 63/029
See application file for complete search history.

(56) References Cited

U.S. PATENT DOCUMENTS 7,055,171 B1 * 5/2006 Martin ................ H04L 12/4641
370/352
7,131,141 B1 * 10/2006 Blewett ............... H04L 63/0209
709/223

(Continued)

OTHER PUBLICATIONS

Securing User Authentication using Single Sign-On in Cloud Computing; Ashish G. Revar et al.; Institute of Technology, Nirma University, Ahmedabad—382 481, Dec. 8-10, 2011 1.*

(Continued)

*Primary Examiner* — James Turchen
(74) *Attorney, Agent, or Firm* — Sprinke IP Law Group

(57) ABSTRACT

This disclosure is directed to systems and methods for securely communicating authentication information in a networked environment such as one involving a client device, a cloud based computing platform, and an enterprise computing environment. Some embodiments may include encrypting, by a client device using a public key, authentication information provided by a user. The encrypted authentication information is sent to a cloud based service which then sends it to an on-premises component residing behind a firewall of an enterprise. The on-premises component decrypts the authentication information using a private key, validates the authentication information, and returns the result to the cloud based service over a network. If validated, the cloud based service establishes a secure connection between the client device and the on-premises component such that the user can access the enterprise's content without the enterprise having to share the authentication information with the cloud based service.

20 Claims, 6 Drawing Sheets

(56) References Cited

U.S. PATENT DOCUMENTS

| | | | | |
|---|---|---|---|---|
| 7,469,294 B1* | 12/2008 | Luo | H04L 63/0272 | 370/406 |
| 8,776,209 B1* | 7/2014 | Kumar | H04L 63/0272 | 380/270 |
| 9,152,781 B2* | 10/2015 | Sowatskey | G06F 21/335 | |
| 9,191,381 B1* | 11/2015 | Popp | H04L 63/08 | |
| 2003/0056096 A1* | 3/2003 | Albert | G06F 21/31 | 713/168 |
| 2008/0072301 A1* | 3/2008 | Chia | H04L 63/0815 | 726/8 |
| 2012/0096159 A1* | 4/2012 | Short | H04L 63/08 | 709/225 |
| 2013/0227657 A1* | 8/2013 | D'Aurelio | G06F 17/30893 | 726/5 |
| 2013/0269019 A1* | 10/2013 | Garmark | G06F 9/54 | 726/9 |
| 2014/0033200 A1* | 1/2014 | Tompkins | H04L 63/061 | 718/1 |
| 2014/0033291 A1* | 1/2014 | Liu | H04L 67/20 | 726/7 |

OTHER PUBLICATIONS

An authentication model towards cloud federation in the enterprise; M. Noureddine et al; Journal of Systems and Software; vol. 86, Issue 9, Sep. 2013, pp. 2269-2275.*

* cited by examiner

SYSTEM AND METHOD FOR SECURING AUTHENTICATION INFORMATION IN A NETWORKED ENVIRONMENT

CROSS-REFERENCE TO RELATED APPLICATION(S)

This application is a conversion of and claims a benefit of priority from U.S. Provisional Application No. 61/842,831, filed Jul. 3, 2013, entitled "SYSTEM AND METHOD FOR SECURING AUTHENTICATION INFORMATION IN A NETWORKED ENVIRONMENT," which is fully incorporated by reference herein for all purposes.

TECHNICAL FIELD

This disclosure relates generally to systems and methods for security in a networked environment. More particularly, this disclosure relates to systems and methods for the management of authentication information. Even more particularly, this disclosure relates to the management of authentication information in a shared software-as-a-service (SaaS) environment, including the management of authentication information such as passwords related to the use of third-party applications such as SaaS applications.

BACKGROUND OF THE RELATED ART

SaaS refers to a software delivery model in which software is centrally hosted, for instance, in a cloud, by software vendors or application service providers (ASPs). In cloud computing, a cloud refers to a computing platform implemented by a network of distributed servers or the like. Examples of a cloud based computing platform may include, for example, Microsoft Windows Azure, Amazon Elastic Compute Cloud, etc.

An individual user who has permission to access a server machine running on a cloud based computing platform can use the server's processing power to run an application, store data, or perform any other computing task. In a SaaS system, a user may access such a centrally hosted application (referred to as a "SaaS application") using a thin client via a web based browser application running on a computing device connected to a network such as the Internet, a Local Area Network (LAN), a Wide Area Network (WAN), etc.

In some cases, authentication may be needed to allow access to certain data using a SaaS application. For example, a company may use a SaaS application hosted in a cloud to manage the company's data. To access the company's data, a user (e.g., an employee of the company) may need to authenticate through the SaaS application. More specifically, the user may provide the SaaS application with authentication information such as user credentials, the SaaS application may receive the authentication information, verify the authentication information, and, if verified, establish an authenticated session for the user. However, this approach may present issues for some entities that are unwilling to share or that cannot share such authentication information with other entities such as a software vendor or application service provider providing the SaaS application. No solutions currently exist that address these issues. Consequently, there is room for innovations and improvements.

SUMMARY OF THE DISCLOSURE

Embodiments disclosed herein provide systems, methods, and computer program products for securely communicating authentication information in a networked environment such as one having client devices, cloud based computing platforms, and enterprise computing environments. Some embodiments of a method may include encrypting, by a client device using a public key, authentication information provided by a user. The encrypted authentication information is sent to a cloud based service which, in turn, sends it to an on-premises component residing behind a firewall of an enterprise. The on-premises component decrypts the authentication information using a private key, validates the authentication information, and returns the result to the cloud based service over a network. If validated, the cloud based service establishes a secure connection such that the user can access the enterprise's content behind the firewall via the cloud based service without the enterprise having to share the authentication information with the cloud based service.

One embodiment of the invention comprises a system having at least one processor and at least one non-transitory computer-readable storage medium that stores computer instructions translatable by a processor to perform a method substantially as described herein. Another embodiment comprises a computer program product having a non-transitory computer-readable storage medium that stores computer instructions translatable by a processor to perform a method substantially as described herein.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
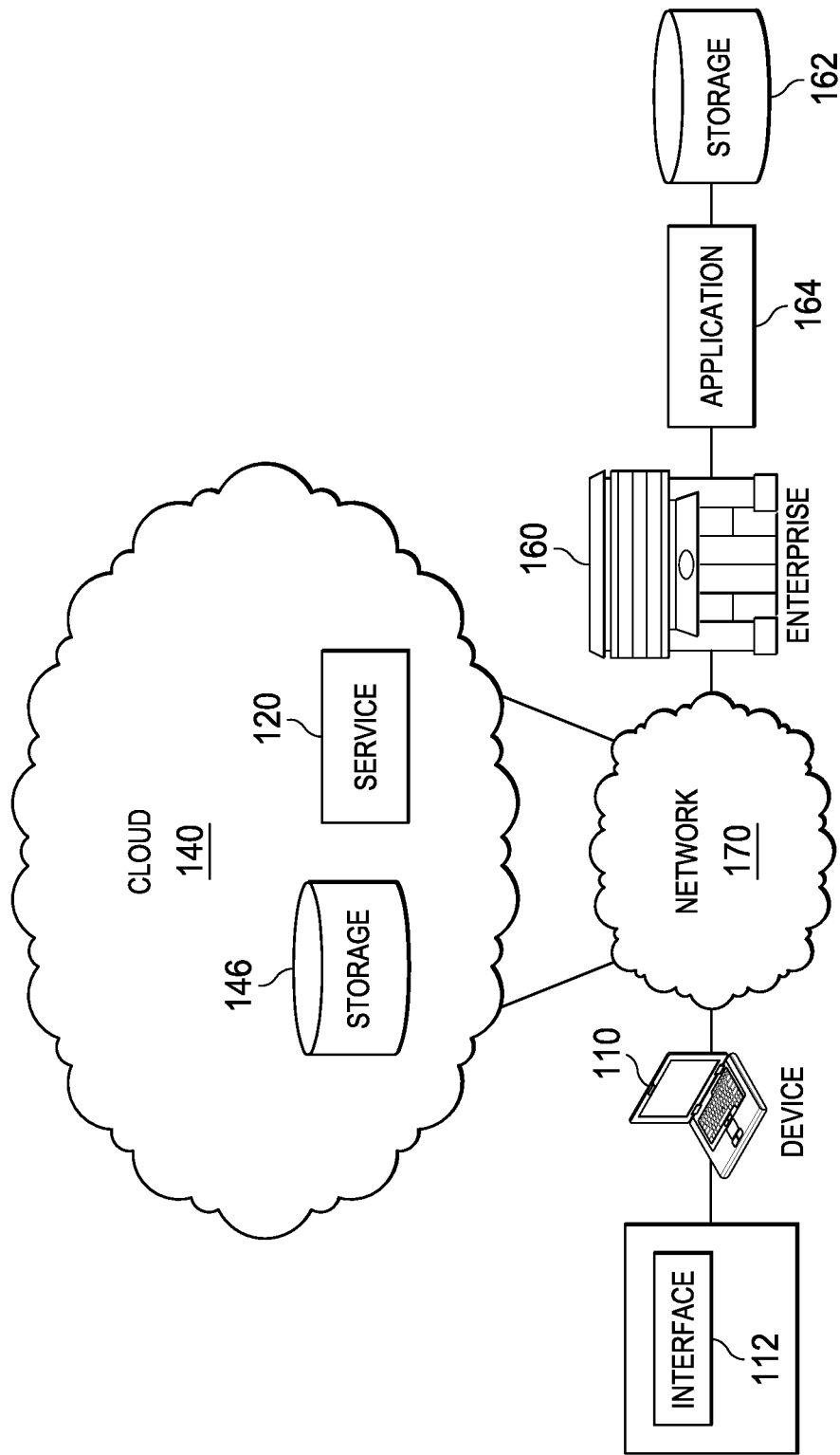
FIG. 1 is a block diagram illustrating one embodiment of a topology of a networked environment.

Before delving into more detail regarding the specific embodiments disclosed herein, some context may be helpful. Turning to FIG. 1, one embodiment of a topology for the provisioning of content or functionality (collectively referred to herein as content) is depicted. Here, enterprise 160, service 120 or storage 146 in cloud 140, and device 110 communicate via network 170 which may be, for example, the Internet, an intranet, a LAN, a WAN, an Internet Protocol (IP) based network, etc. These communications may be accomplished according to one or more protocols such as, for example, Hypertext Transfer Protocol (HTTP), Representational State Transfer (REST), Simple Object Access Protocol (SOAP), etc. and in one or more formats such as, for example, Extensible Markup Language (XML), Hypertext Markup Language (HTML), JavaScript Object Notation (JSON), etc. The Internet, LANs, WANs, IP networks, HTTP, REST, SOAP, XML, HTML, and JSON are known to those skilled in the art and thus are not further described herein.

Enterprise 160, such as a business, individual, or almost any other type of organization or entity, may provide functionality or content (e.g., almost any type of functionality provided by application 164 or data stored in data store 162, including provisioning, aggregation, etc.). Application(s) 164 or data store(s) 162 may be on the physical premises controlled by enterprise 160. Alternatively, such application(s) 164 or data store(s) 162 may be kept or maintained at another location under control of enterprise 160 or provided by a third-party provider under control of enterprise 160. As such, the term "on-premises" as used herein should not be taken only to mean at a certain physical location associated with an enterprise, but should also be taken to mean verified or otherwise trusted by the enterprise or operators thereof.

In some cases, it may be desired to allow access to content of enterprise 160 (e.g., functionality of application 164 or data of data store 162) by remote users or users outside of enterprise 160. To facilitate this type of access, service 120 and storage 146 may be provided in cloud 140 or at a location remote from enterprise 160 or by an entity distinct from enterprise 160.

Service 120 may provide, via one or more applications hosted on one or more server machines operating in cloud 140, one or more services which may be accessed by user(s) at device(s) 110 to, in turn, allow access to content of enterprise 160 (e.g., enterprise data stored in cloud storage 146, on-premises storage 162, or a third-party repository, etc.). More specifically, in some embodiments, service 120 may include one or more interfaces 112 which may be accessed by a user at device 110 (e.g., using a browser, a proprietary application, etc.). Using interface 112, a user of device 110 may be provided with the ability to request/receive or otherwise interact with application 164 and/or access, manage, view, or otherwise take action on data residing in data store 162. For example, a request for content may be received by service 120 in cloud 140 from device 110 via interface 112. Service 120 may then communicate the request for content with application 164 to obtain the desired content and return the requested content to device 110 through interface 112.

In some embodiments, service 120 may be provided by a SaaS application running on a server machine in cloud 140 communicatively connected to a computer running application 164 in a computing environment of enterprise 160. Service 120 may be provided by a SaaS provider. In some instances, the SaaS provider may be an entity independent of and distinct from enterprise 160 and/or an operator of a cloud based computing platform supporting cloud 140.

In many cases, enterprise 160 may wish to keep its content secure. Accordingly, enterprise 160 may require a user to be authenticated before access to content (or a subset thereof) of application 164 is allowed. For example, enterprise 160 may require that authentication information (e.g., a username, password, credentials, or other identification information) be provided by a user and verified before the user is allowed to access content in association with application 164.

As a user at device 110 is attempting to access content at enterprise 160 using service 120 deployed in cloud 140, however, this presents issues. Specifically, there is a need to provide the authentication information to service 120 (and hence to the SaaS provider providing service 120) and have this authentication information for the user verified before a user at the device 110 is granted access to content at enterprise 160. Understandably, enterprise 160 may not wish to have such authentication information transmitted to service 120 in cloud 140 and then to enterprise 160 when the authentication information is to be verified in order to establish an authenticated session or the like where the user at device 110 may access desired content. Complicating these issues, from a security and in some cases, regulatory, perspective, in many instances the provider of service 120 may be an entity distinct and independent from enterprise 160. Such a situation may serve to increase anxiety of enterprise 160 about the transmission of authentication information. Moreover, in some instances, additional security may be required (by regulatory or governing agencies).

Figure 2:
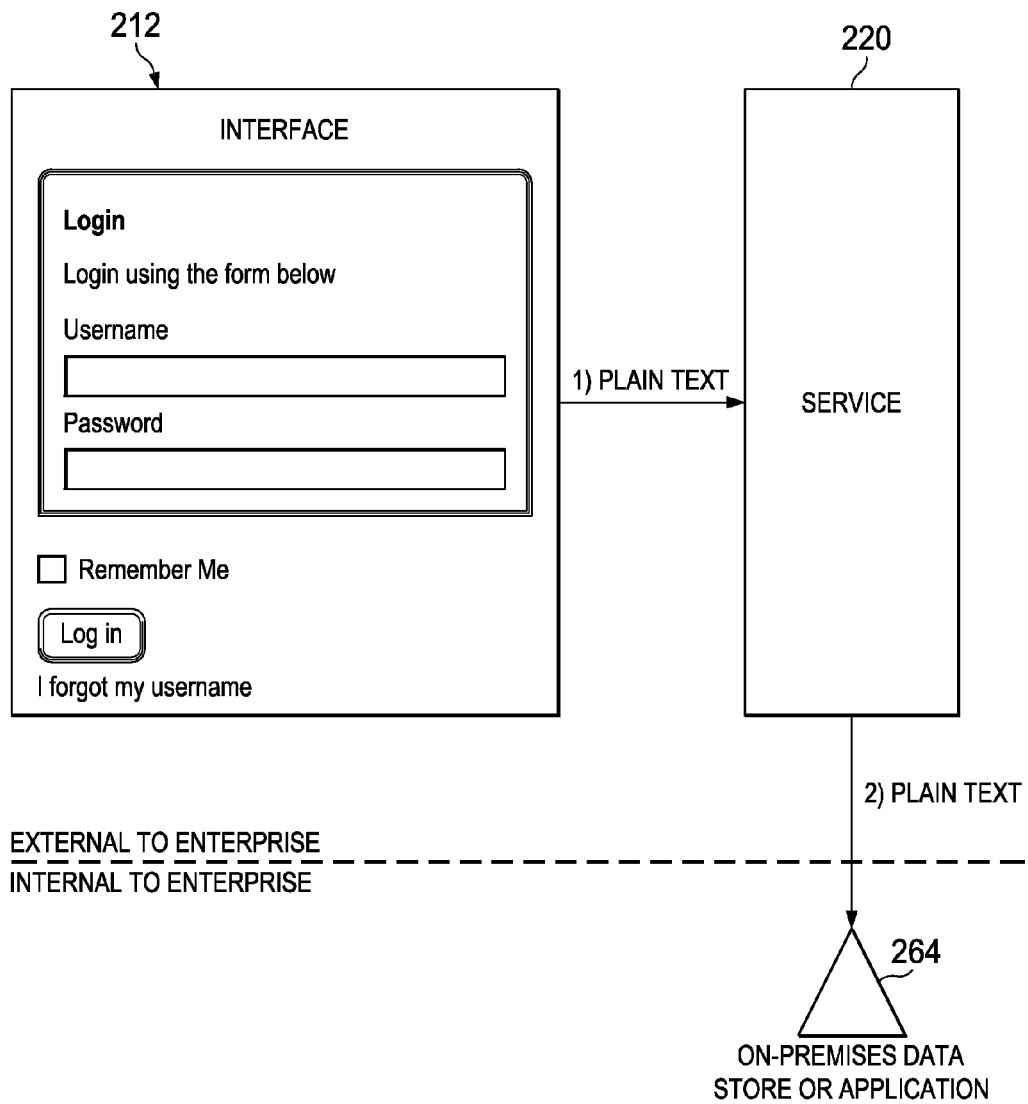
FIG. 2 is a block diagram illustrating one embodiment of securing authentication information in a networked environment.

Moving now to FIG. 2, an example of architecture for the transmission and use of authentication information in conjunction with use of a content provider service is depicted. Here, a user may enter their authentication information (e.g., a username and password) via a web application login form, etc. presented on interface 212 of a user's device. Interface 212 may transmit this authentication information to service 220 which is hosted remotely, for instance, in a cloud. While this transmission usually occurs over a secure channel, such as HTTPS, service 220 receives the user's password in plain text. Additionally, a direct connection (e.g., using HTTPS or the like) may be opened from service 220 to on-premises system 264 (e.g., application or data store from which content is being provided or server associated with the application or data store such as an Active Directory server) which may be internal to the enterprise (e.g., behind a firewall, or otherwise trusted or secured). The authentication information can then be passed from service 220 to on-premises system 264 for validation. If the authentication information is validated, an authenticated session (or the like) may be established by service 220 in which the user can access on-premises system 264 using service 220.

Figure 3:
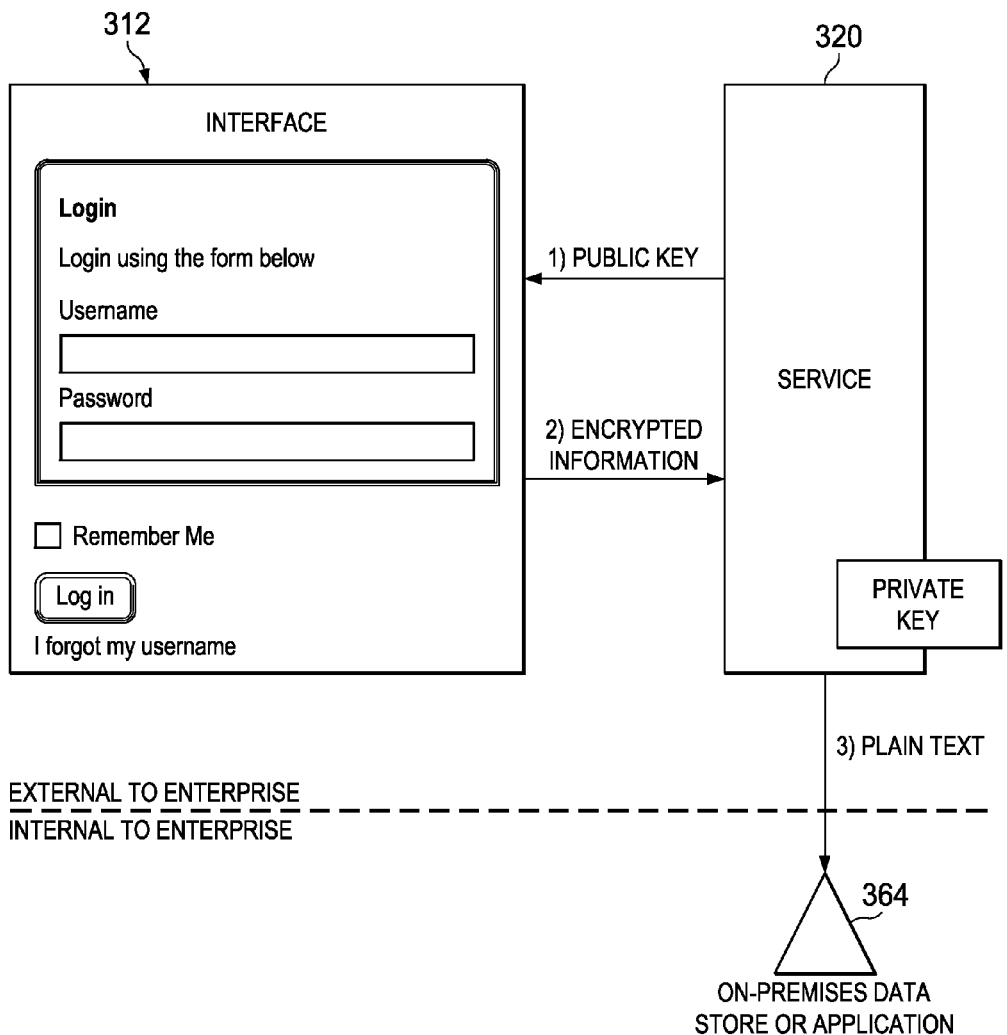
FIG. 3 is a block diagram illustrating one embodiment of securing authentication information in a networked environment.

As can be seen, this architecture may not protect the user's password, as it must be transmitted in plain text. Another example of architecture for the use of authentication information in conjunction with use of a content provider service is depicted in FIG. 3. Here, authentication information may be encrypted using encryption keys controlled by the content service provider, who controls the encryption keys. In other words, in these embodiments, asymmetric encryption may be utilized such that a user provides authentication information using interface 312 presented at the user's device.

In this example, interface 312 is configured with a public key provided by service 320. This authentication information may be encrypted by interface 312 using the public key and the encrypted password transmitted to service 320. Service 320 may then decrypt the authentication information using a corresponding private key (which belongs to an operator of service 320). Additionally, a direct connection (e.g., using HTTPS or the like) may be opened from service 320 to on-premises system 364. The authentication information can then be passed, in plain-text form, from service 320 to on-premises system 364 for validation. If the authentication information is validated, an authenticated session (or the like) may be established for the user as discussed above.

While this embodiment may reduce who can decrypt the authentication information to an operator of service 320 (or others with access to the operator's private key), it is often difficult for the enterprise that controls on-premises system 364 to know the scope of who has access to the private key (because the enterprise may not be in control of the private key). Transparency about the scope of risk may be provided by third-party auditors who may manually confirm who has access to encryption keys with periodic audits. However, there is a risk with this process that security of the process may be compromised between audits. Furthermore, the audits may only provide transparency about the scope of the risk and do not eliminate the risk of others compromising access to the authentication information and/or to the private key.

What is particularly desired, therefore, is to provide management of authentication information in conjunction with use of a content provider service, such as pass-through authentication and password resets, without requiring the plain-text authentication information to be visible in components of the environment hosted in an environment external to the enterprise (e.g., in the cloud, at the user's device, etc.). In particular, it is desired that the plain-text password not be stored or logged anywhere outside the enterprise (e.g., outside of a firewall provided by the enterprise or outside locations not trusted or verified by the enterprise, etc.), thereby reducing the risk in leveraging a content provider service (e.g., hosted in the cloud or at a third-party provider, etc.).

To that end, attention is now directed to embodiments of the systems and methods presented herein which utilize an on-premises (e.g., with respect to an enterprise) component that is associated with a cloud based service to ensure the security of authentication information. In particular, embodiments may leverage asymmetric cryptography to encrypt authentication information before it leaves a user's system, with the corresponding decryption key available only to the on-premise component. This allows the encrypted authentication information (e.g., cipher text) to be transmitted through any number of intermediary systems without revealing the plain text of the authentication information. Once the authentication information reaches the on-premises component it can be decrypted and any operations that utilize this authentication information (e.g., validation of the authentication information, establishing an authenticated session, etc.) performed.

One example of the use of such systems and methods is pass-through authentication, via which a user can authenticate using authentication information stored in an on-premises component which employs Active Directory or the like. A browser-based Rich Internet Application (RIA) or mobile application or other code on the user device is used to authenticate the user, allowing the input (e.g., authentication information) to be modified (e.g., encrypted) on the user's device before submission to the content provider service or on-premises data store or application. This is in contrast to a traditional forms-based application that submits the data as entered to the on-premises data store or application for validation.

In such embodiments, a public key is made available to a client application (e.g., JavaScript executing in conjunction with an interface loaded on a user's browser, a proprietary application, etc.) running on a user's device. Before the authentication information is transmitted to a cloud based service for verification, it is encrypted to produce the cipher text. This cipher text is passed through the cloud based service (or other intermediary systems) before being provided to the on-premises component that has access to the corresponding private key and the ability to validate the authentication information. The on-premises component, which hides behind a firewall of an enterprise, decrypts the authentication information, validates it, and sends the appropriate success or failure message to the cloud based service. The private key can also be used to sign the response, allowing for verification of the response. If the authentication information is validated, an authenticated session (or the like) may be established.

As can be seen then, utilizing embodiments as disclosed herein, an enterprise can deploy advanced authentication information management functionality without reducing the operational security of their computing environment as neither plain-text authentication information nor authentication information encrypted with keys not controlled by the enterprise are transferred through intermediary servers. Additionally, both authentication information and keys are protected by disallowing direct connections to the enterprise's internal infrastructure components containing sensitive information.

Figure 4:
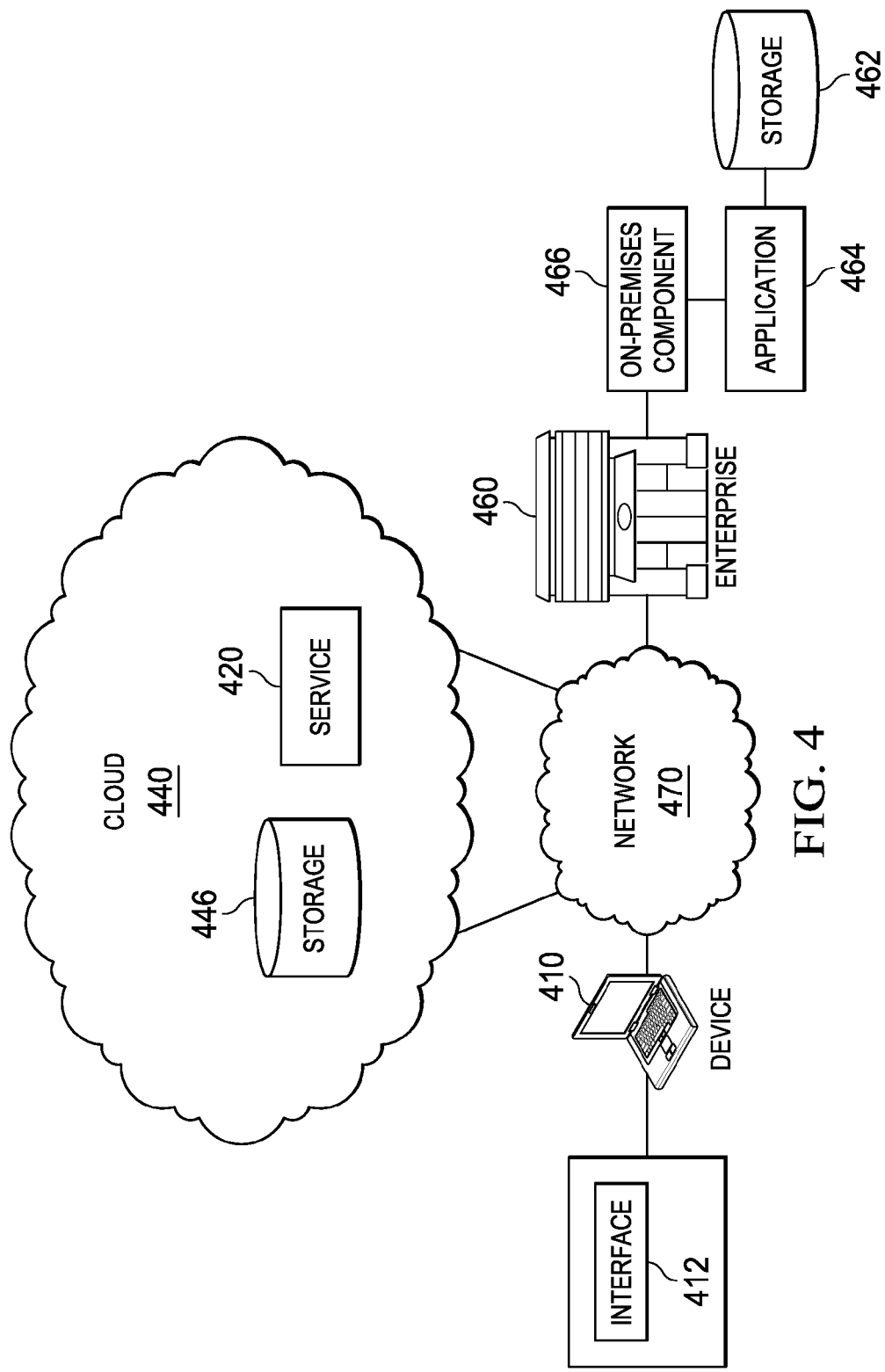
FIG. 4 is a block diagram of one embodiment of a topology of a networked environment.

Referring now to FIG. 4, one embodiment of a topology for the provisioning of content is depicted. Similar reference numerals are used to refer to similar items described in FIG. 1 (e.g., storage 446 shown in FIG. 4 may be similar to storage 146 shown in FIG. 1) and thus will not be explained further. Notice with respect to the example embodiment depicted in FIG. 4, on-premises component 466 is associated with enterprise 460 and application 464 and data store 460.

It should be noted again that on-premises component 466 as discussed herein does not have to be physically associated with enterprise 460, application 464, data store 462, etc. Such an on-premises component 466 may be at a different physical location or under the control of a different entity than enterprise 460, as long as such an on-premises component or module is verified or otherwise trusted by providers of enterprise 460 and service 420 to protect authentication information. As on-premises component 466 may be deployed behind the firewall of enterprise 460 and may have network access to systems internal to the computing environment of enterprise 460, it may have a higher level of trust than external systems (e.g., even higher than the systems of service 420 hosted in cloud 440).

In any event, on-premises component 466 may be configured to decrypt encrypted authentication information received from service 420 over network 470 and verify such authentication information such that an authenticated session may be established and access granted to application 464 or content of data store 462 through service 420. As such, on-premises component 466 may be configured to communicate with service 420 (e.g., provide one or more web services, application programming interfaces (APIs), etc. which may be accessed by content provider service 420, etc.) with its own private key. When a user enters their authentication information using interface 412 at their device 410, the authentication information may be encrypted at the user's device (e.g., by JavaScript associated, loaded or otherwise accessed in conjunction with interface 412) using a public key corresponding to the private key of on-premises component 466.

This encrypted authentication information is then sent from device 410 to service 420 in cloud 440 where it is then transmitted (still in encrypted form) to on-premises component 466 along with an authentication request. On-premises component 466 may receive this authentication request with the encrypted authentication information, decrypt the authentication information using its private key, validate the authentication information and allow access to application 464 or content of data store 462 via service 460 in association with that user so that service 420 may provide content from application 464 or data store 462 to that user. Additionally, this same key pair (private-public key pair) can be used to sign the response to the authentication request sent by on-premises component 466 to service 420 such that service 420 can verify on-premises component 466 was the entity that validated the authentication information.

Figure 5:
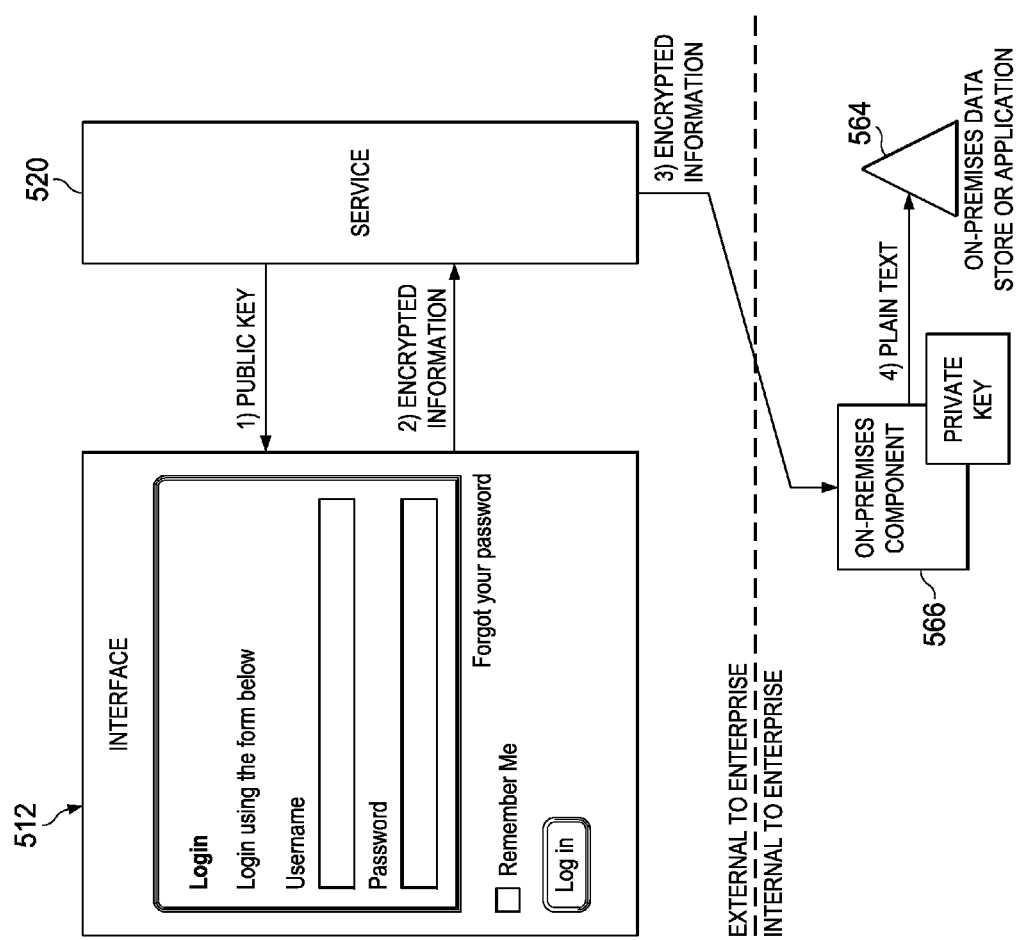
FIG. 5 is a block diagram illustrating one embodiment of securing authentication information in a networked environment.

One embodiment of an architecture for the use of authentication information in conjunction with use of a content provider service is depicted in FIG. 5. Here, on-premises component 566 is deployed behind an enterprise's firewall and has network access to the enterprise's internal systems. As on-premises component 566 is deployed into the enterprise's internal environment, it has a higher level of trust than external systems outside of the enterprise's control.

In this example, an asymmetric key pair has been created and provisioned such that on-premises component 566 has the private key and service 520 has the public key. This allows service 520 to encrypt data using this public key, and only on-premises component 566 can decrypt the encrypted data using its private key.

This key pair may therefore be leveraged when storing or transmitting sensitive data, such as authentication information. The use of such a key pair may be illustrated using a pass-through authentication scenario once again. Here, a user is once again presented with a login form though interface 512 running on the user's device. However, in this case, interface 512 also contains code executing on the user's device (e.g., client-side code such as JavaScript or the like, from service 520 or an operator of service 520) that allows interface 512 to manipulate the data before it is sent to service 520. This code executing on the user's device has access to the aforementioned public key (step 1), and when the user submits the authentication information (e.g., a username and password), interface 512 encrypts the authentication information with this public key before sending it to service 520 (step 2).

The encrypted authentication information is transmitted from service 520 to on-premises component 566 (step 3). This could either be a direct connection between service 520 and on-premises component 566, or another transmission mechanism. Once on-premises component 566 receives the encrypted authentication information, it decrypts it using its private key. This provides on-premises component 566 with access to the original authentication information entered by the user. On-premises component 566 then validates the (now decrypted) authentication information against on-premises system 564 (e.g., a data store or application) and returns the result to service 520 (step 4).

Figure 6:
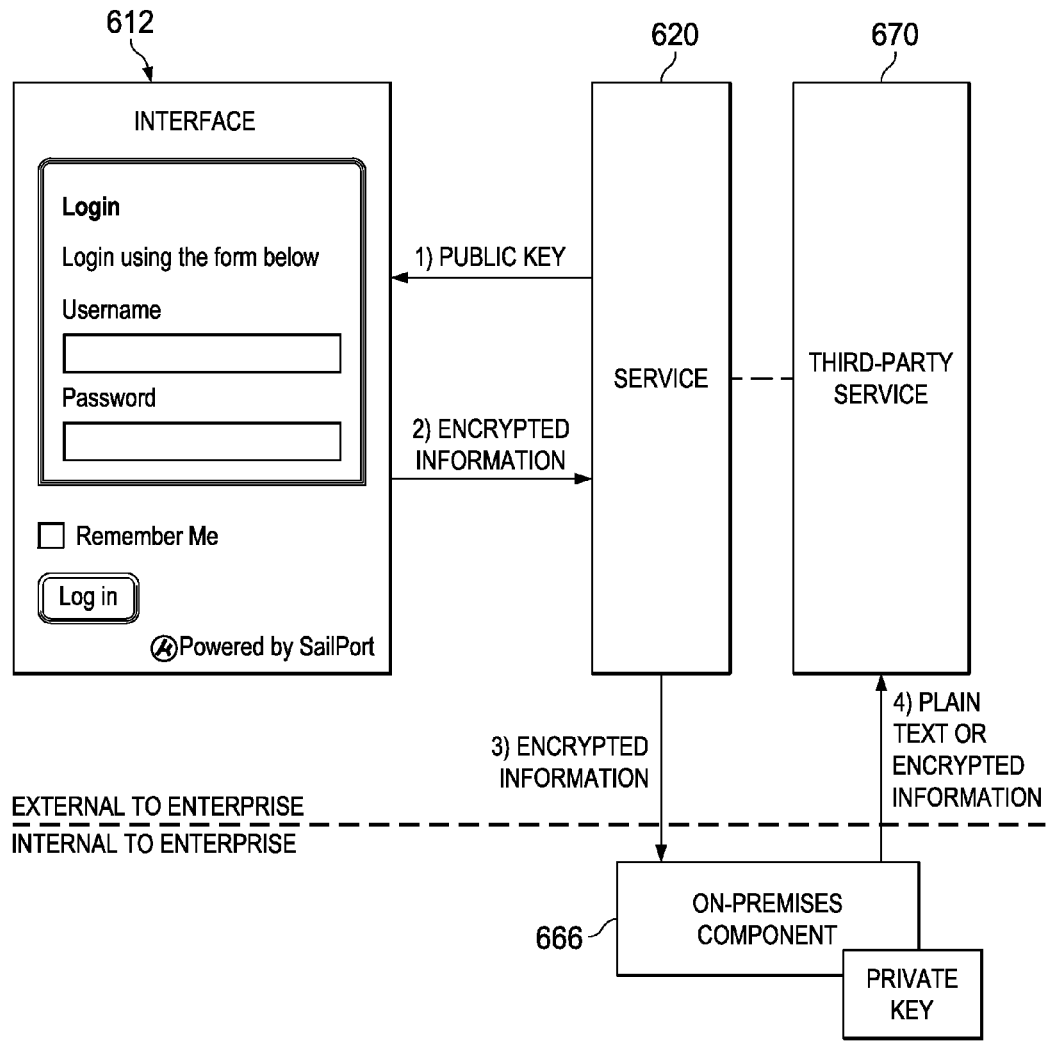
FIG. 6 is a block diagram illustrating one embodiment of securing authentication information in a networked environment.

While the above example and text describes a pass-through authentication scenario, similar embodiments may be equally effectively applied to other operations that utilize authentication information to access an application, data store, etc. FIG. 6 depicts one such example. In such an example, consider a provisioning operation where new data needs to be written into the on-premises data store. The authentication information required to do this by definition have a high level of access and should be protected. Using embodiments as depicted, the authentication information can be encrypted by interface 612 at a user's device before it is sent to service 620, for instance, for storage. When a data store or application needs to be accessed, the requested operation and the encrypted authentication information can be sent to on-premises component 666 that can decrypt the authentication information and perform the requested operation. In some embodiments, in order to perform such a requested operation, on-premises component 666 may utilize the decrypted authentication information (or encrypted in some other way) to access a third-party service 670 (which may be provided by an entity or operator that is not controlled or provided by the enterprise or the provider or operator of service 620), such as third-party SaaS. Thus, embodiments may apply equally well to provisioning of content accessed through the enterprise at third-party sites.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Read-Only Memories (ROMs), Random Access Memories (RAMs), and Hard Drives (HDs) are computer memories for storing computer-executable instructions executable by a central processing unit (CPU) or capable of being compiled or interpreted to be executable by the CPU. Suitable computer-executable instructions may reside on a computer readable medium (e.g., a ROM, a RAM, and/or a HD), hardware circuitry or the like, or any combination thereof. Within this disclosure, the term "computer readable medium" is not limited to ROMs, RAMs, and HDs and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such a process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

The scope of the present disclosure should be determined by the following claims and their legal equivalents.

What is claimed is:

1. A method, comprising:
    encrypting, at a client device operated by a first party using a public key, original authentication information provided by the first party at the client device to generate encrypted authentication information, wherein the public key and instructions for encrypting the authentication information were provided by a cloud based service operated by a second party in response to an access to the cloud based service by the client device operated by the first party;
    the client device providing the encrypted authentication information to the cloud based service operated by the second party;
    the cloud based service providing the encrypted authentication information to an on-premises component residing behind a firewall of an enterprise operated by a third party distinct from the first party and second party;
    the on-premises component decrypting the encrypted authentication information using a private key corresponding to the public key provided by the cloud based service operated by the second party to obtain the original authentication information;
    the on-premises component performing a validation on the original authentication information; and
    the on-premises component returning a result of the validation to the cloud based service over a network, wherein the result is signed by the on-premises component using the private key such that the cloud based service operated by the second party can verify the result was sent by the on-premises component behind the firewall of the enterprise operated by the third party.

2. The method according to claim 1, further comprising:
    based on the result of the validation being valid, the cloud based service establishing a secure connection between the client device and the on-premises component.

3. The method according to claim 2, further comprising:
    the on-premises component providing the client device, via the secure connection, access to an on-premises system operating behind the firewall of the enterprise.

4. The method according to claim 3, wherein communications between the on-premises component and the on-premises system are not encrypted.

5. The method according to claim 1, further comprising:
    subsequent to receiving the encrypted authentication information from the client device, the cloud based service opening a direct connection to the on-premises component and providing the encrypted authentication information to the on-premises component via the direct connection.

6. The method according to claim 1, further comprising:
    configuring an interface running on the client device with the public key, wherein the interface encrypts the original authentication information using the public key before sending the encrypted authentication information to the cloud based service.

7. The method according to claim 1, wherein the on-premises component utilizes the original authentication information or the encrypted authentication information to access a third-party service not controlled by the enterprise.

8. A computer program product comprising at least one non-transitory computer readable medium storing instructions translatable by at least one processor to perform:
    encrypting, at a client device operated by a first party using a public key, original authentication information provided by the first party at the client device to generate encrypted authentication information, wherein the public key and instructions for encrypting the authentication information were provided by a cloud based service operated by a second party in response to an access to the cloud based service by the client device operated by the first party;
    providing the encrypted authentication information from the client device to the cloud based service operated by the second party;
    providing the encrypted authentication information from the cloud based service to an on-premises component residing behind a firewall of an enterprise operated by a third party distinct from the first party and second party;
    decrypting the encrypted authentication information at the on-premises component using a private key corresponding to the public key provided by the cloud based service operated by the second party to obtain the original authentication information;
    performing a validation on the original authentication information by the on-premises component; and
    returning, by the on-premises component, a result of the validation to the cloud based service over a network, wherein the result is signed by the on-premises component using the private key such that the cloud based service operated by the second party can verify the result was sent by the on-premises component behind the firewall of the enterprise operated by the third party.

9. The computer program product of claim 8, wherein the at least one non-transitory computer readable medium stores further instructions translatable by the at least one processor to perform:
based on the result of the validation being valid, establishing a secure connection between the client device and the on-premises component.

10. The computer program product of claim 9, wherein the at least one non-transitory computer readable medium stores further instructions translatable by the at least one processor to perform:
providing the client device, via the secure connection, access to an on-premises system operating behind the firewall of the enterprise.

11. The computer program product of claim 10, wherein communications between the on-premises component and the on-premises system are not encrypted.

12. The computer program product of claim 8, wherein the at least one non-transitory computer readable medium stores further instructions translatable by the at least one processor to perform:
subsequent to receiving the encrypted authentication information from the client device, opening a direct connection from the cloud based service to the on-premises component and providing the encrypted authentication information to the on-premises component via the direct connection.

13. The computer program product of claim 8, wherein the at least one non-transitory computer readable medium stores further instructions translatable by the at least one processor to perform:
configuring an interface running on the client device with the public key, wherein the interface encrypts the original authentication information using the public key before sending the encrypted authentication information to the cloud based service.

14. A system, comprising:
at least one processor; and
at least one non-transitory computer readable medium storing instructions translatable by the at least one processor to perform:
encrypting, at a client device operated by a first party using a public key, original authentication information provided by the first party at the client device to generate encrypted authentication information, wherein the public key and instructions for encrypting the authentication information were provided by a cloud based service operated by a second party in response to an access to the cloud based service by the client device operated by the first party;
providing the encrypted authentication information from the client device to the cloud based service operated by the second party;
providing the encrypted authentication information from the cloud based service to an on-premises component residing behind a firewall of an enterprise operated by a third party distinct from the first party and second party;
decrypting the encrypted authentication information at the on-premises component using a private key corresponding to the public key provided by the cloud based service operated by the second party to obtain the original authentication information;
performing a validation on the original authentication information by the on-premises component; and
returning, by the on-premises component, a result of the validation to the cloud based service over a network, wherein the result is signed by the on-premises component using the private key such that the cloud based service operated by the second party can verify the result was sent by the on-premises component behind the firewall of the enterprise operated by the third party.

15. The system of claim 14, wherein the at least one non-transitory computer readable medium stores further instructions translatable by the at least one processor to perform:
based on the result of the validation being valid, establishing a secure connection between the client device and the on-premises component.

16. The system of claim 15, wherein the at least one non-transitory computer readable medium stores further instructions translatable by the at least one processor to perform:
providing the client device, via the secure connection, access to an on-premises system operating behind the firewall of the enterprise.

17. The system of claim 16, wherein communications between the on-premises component and the on-premises system are not encrypted.

18. The system of claim 14, wherein the at least one non-transitory computer readable medium stores further instructions translatable by the at least one processor to perform:
subsequent to receiving the encrypted authentication information from the client device, opening a direct connection from the cloud based service to the on-premises component and providing the encrypted authentication information to the on-premises component via the direct connection.

19. The system of claim 14, wherein the at least one non-transitory computer readable medium stores further instructions translatable by the at least one processor to perform:
configuring an interface running on the client device with the public key, wherein the interface encrypts the original authentication information using the public key before sending the encrypted authentication information to the cloud based service.

20. The system of claim 14, wherein the on-premises component utilizes the original authentication information or the encrypted authentication information to access a third-party service not controlled by the enterprise.

* * * * *